US012726305B2

(12) United States Patent
Zhang et al.

(10) Patent No.: US 12,726,305 B2
(45) Date of Patent: Sep. 1, 2026

(54) TRANSMISSION CONFIGURATION INDICATION STATE FOR CARRIER AGGREGATION SCHEDULING

(71) Applicant: ZTE Corporation, Shenzhen (CN)

(72) Inventors: Yang Zhang, Shenzhen (CN); Ke Yao, Shenzhen (CN); Bo Gao, Shenzhen (CN); Zhaohua Lu, Shenzhen (CN); Yu Ngok Li, Shenzhen (CN); Wenjun Yan, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 297 days.

(21) Appl. No.: 18/491,196

(22) Filed: Oct. 20, 2023

(65) Prior Publication Data

US 2024/0048318 A1 Feb. 8, 2024

Related U.S. Application Data

(63) Continuation of application No. PCT/CN2022/091039, filed on May 5, 2022.

(51) Int. Cl.
*H04L 5/00* (2006.01)

(52) U.S. Cl.
CPC ............ *H04L 5/0048* (2013.01); *H04L 5/001* (2013.01); *H04L 5/0053* (2013.01); *H04L 5/0094* (2013.01)

(58) Field of Classification Search
CPC ..... H04L 5/0048; H04L 5/001; H04L 5/0053; H04L 5/0094
See application file for complete search history.

(56) References Cited

U.S. PATENT DOCUMENTS

| | | | | |
|---|---|---|---|---|
| 2020/0351039 | A1 | 11/2020 | Zhou et al. | |
| 2021/0127388 | A1 | 4/2021 | Venugopal et al. | |
| 2021/0153175 | A1 | 5/2021 | Chande et al. | |
| 2021/0400668 | A1* | 12/2021 | Matsumura | H04L 27/261 |
| 2023/0403108 | A1* | 12/2023 | Grossmann | H04L 5/0091 |
| 2024/0214173 | A1* | 6/2024 | Matsumura | H04L 5/001 |
| 2025/0150243 | A1* | 5/2025 | Zhang | H04L 5/0044 |

FOREIGN PATENT DOCUMENTS

| | | | |
|---|---|---|---|
| CN | 113519137 | A | 10/2021 |
| WO | 2021038682 | A1 | 3/2021 |
| WO | 2021186726 | A1 | 9/2021 |
| WO | 2022079903 | A1 | 4/2022 |

OTHER PUBLICATIONS

International Search Report & Written Opinion for Appl. No. PCT/CN2022/091039, mailed Nov. 28, 2022, 9 pages.

(Continued)

*Primary Examiner* — Duc C Ho
(74) *Attorney, Agent, or Firm* — Perkins Coie LLP

(57) ABSTRACT

A method of wireless communication is described. The wireless communication method includes deriving, by a user device, in response to a determination that a predetermined condition is met, at least one of transmission configuration indication (TCI) states of a target component carrier based on a TCI state of a reference component carrier; and applying the at least one of TCI states to the target component carrier.

18 Claims, 5 Drawing Sheets

1000

Deriving, by a user device, in response to a determination that a predetermined condition is met, at least one of transmission configuration indication (TCI) states of a target component carrier based on a TCI state of a reference component carrier — 1010

Applying the at least one of TCI states to the target component carrier — 1020

(56) References Cited

OTHER PUBLICATIONS

Huawei et al., "Remaining issues on multi-beam enhancements in R16," 3GPP TSG RAN WG1 Meeting #100bis-e R1-2001564 Apr. 30, 2020, 14 pages.
Mediatek, Inc., "Discussion on unified TCI for DL and UL," 3GPP TSG-RAN WG4 Meeting # 103-e, R4-2208465, Electronic Meeting, May 9-May 20, 2022 (9 pages).
VIVO, "Further discussion on multi beam enhancement," 3GPP TSG RAN WG1 #106-e, R1-2106571, e-Meeting, Aug. 16-27, 2021 (30 pages).
Mediatek, Inc., "Enhancement on multi-beam operation," 3GPP TSG RAN WG1 #106bis-e, R1-2109543, e-Meeting, Oct. 11-19, 2021 (27 pages).
NTT Docomo, Inc., "Remaining issues on multi-beam operation," 3GPP TSG RAN WG1 #109-e, R1-2204335, e-Meeting, May 9-20, 2022 (13 pages).
ZTE, "Further details on Multi-beam and Multi-TRP operation," 3GPP TSG RAN WG1 Meeting #104-e, R1-2100292, e-Meeting, Jan. 25-Feb. 5, 2020 (20 pages).
Qualcomm Inc., "Enhancements on Multi-beam Operation," 3GPP TSG RAN WG1 Meeting #109-e, R1-2204976, May 9-May 20, 2022 (13 pages).
LG Electronics, "Enhancements on Multi-beam Operation," 3GPP TSG RAN WG1 #108-e, R1-2201567, e- Meeting, Feb. 21-Mar. 3, 2022 (14 pages).
Samsung (Moderator), "Moderator Summary of Offline Discussion on Rel-17 Multi-Beam," 3GPP TSG RAN WG1 #108-e, R1-2201995, e-Meeting, Feb. 21-Mar. 3, 2022 (48 pages).
Extended European Search Report for European Patent Application No. 22940572.5, mailed Jun. 17, 2025 (19 pages).

* cited by examiner

TRANSMISSION CONFIGURATION INDICATION STATE FOR CARRIER AGGREGATION SCHEDULING

CROSS REFERENCE TO RELATED APPLICATIONS

This patent document is a continuation of and claims benefit of priority to International Patent Application No. PCT/CN2022/091039, filed on May 5, 2022. The entire content of the before-mentioned patent application is incorporated by reference as part of the disclosure of this application.

TECHNICAL FIELD

This patent document generally relates to systems, devices, and techniques for wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices.

SUMMARY

This document relates to methods, systems, and devices for TCI state indication for carrier aggregation scheduling in wireless communications.

In one aspect, a wireless communication method is disclosed. The wireless communication method includes deriving, by a user device, in response to a determination that a predetermined condition is met, at least one of transmission configuration indication (TCI) states of a target component carrier based on a TCI state of a reference component carrier; and applying the at least one of TCI states to the target component carrier.

In another aspect, a wireless communication method is disclosed. The wireless communication method includes transmitting, by a network device to a user device, a signaling message including transmission configuration indication (TCI) configuration information of a target component carrier and a reference component carrier; and receiving, from the user device, an uplink transmissions using the target component carrier having a transmission configuration indication (TCI) state that is derived based on a TCI state of a reference component carrier.

In another aspect, a communication apparatus comprising a processor configured to implement the above-described method is disclosed.

In another aspect, a computer readable medium having code stored thereon, the code, when executed, causing a processor to implement the above-described method is disclosed.

These, and other features, are described in the present document.

DETAILED DESCRIPTION

The disclosed technology provides implementations and examples of TCI state indication for carrier aggregation (CA) scheduling in wireless communications.

In current 5G NR system, several transmission schemes of multiple transmission reception point (MTRP) operation have been specified for DL (downlink) and UL (uplink) transmissions on top of single transmission reception point (STRP) operation to improve the reliability and throughput of downlink (DL) and uplink (UL) channel/signal. With respect to beam indication of DL/UL channel/signal, unified TCI state indication is supported in the related specification, for example, Rel-17, but only for STRP operation.

Various implementations of the disclosed technology are provided to enhance common TCI state pool configuration for carrier aggregation (CA) in MTRP operation, where each component carrier (CC) can be individually configured with STRP operation or MTRP operation.

The 5G NR includes a number of MIMO features that facilitate utilization of a large number of antenna elements at a base station for both sub-6 GHz (Frequency Range 1, FR1) and over-6 GHz (Frequency Range 2, FR2) frequency bands. One of the MIMO features is the support for multi-TRP operation. The key point of this functionality is to collaborate with multiple TRPs to transmit data to the UE to improve transmission performance. As NR is in the process of commercialization, various aspects that require further enhancements can be identified from real deployment scenarios.

Figure 1:
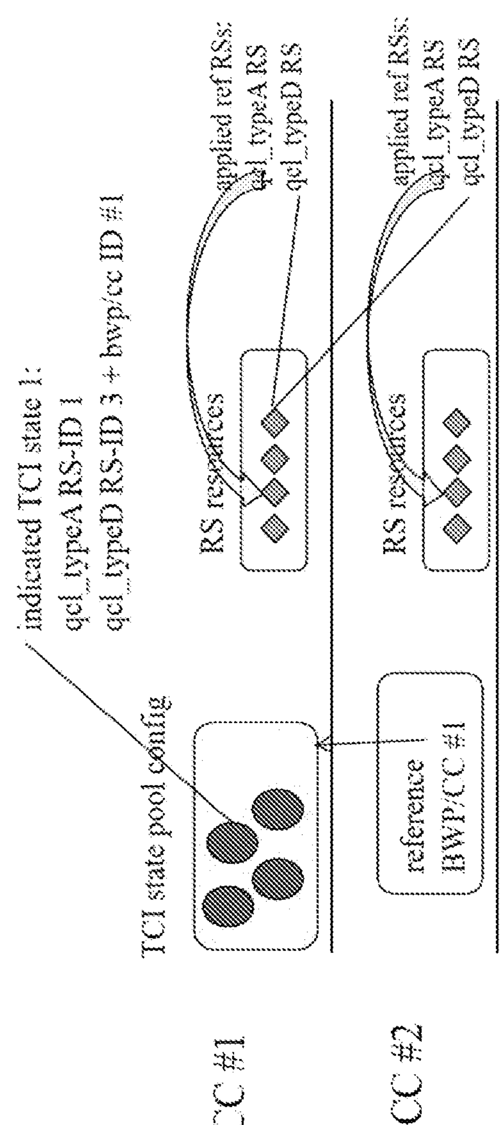
FIG. 1 illustrates a diagram of a common TCI state pool configuration for carrier aggregation (CA) operation.

In Rel-17 NR, in order to achieve a flexible beam update scheme for DL/UL data and control transmission/reception with low signalling overhead and latency, unified TCI state indication for simultaneous DL/UL beam indication was introduced, where at least one source RS of a unified (incl. joint and separate) TCI state provides a reference for determining QCL assumption and/or spatial filter. To further enhance NR MIMO features, common DL/UL beam indication cross carries under the unified TCI framework was additionally introduced and supported in Rel-17. FIG. 1 shows a common TCI state pool configuration for CA operation for the STRP operation. Referring to FIG. 1, the TCI state pool configuration can be absent in PDSCH configuration, e.g. PDSCH-Config, for a target bandwidth part (BWP)/component carrier (CC) (denoted as CC #2 in FIG. 1), and replaced by a reference BWP/CC indication. A TCI state pool is configured in a reference BWP/CC (denoted as CC #1 in FIG. 1). At least QCL-Type A/D source RS applied in CC #0 is derived from the reference CC. If the source RS in the TCI state in the reference CC is QCL-Type A RS, the RS ID of the QCL-Type A source RS applied in CC #0 is the same as the RS ID of the QCL-Type A source RS applied in the reference CC. If the source RS in the TCI state in the reference is QCL-Type D RS, the QCL-Type D source RS applied in CC #0 is the same as the QCL-Type D source RS applied in the reference CC.

Notes that, in this patent document, the term, "beam state," refers to at least one of quasi-co-location (QCL) state, transmission configuration indicator (TCI) state, spatial relation (also called as spatial relation information), reference signal (RS), spatial filter or precoding. In this patent document, "beam state" is also called as "beam." Also, please note followings:

In some implementations of the disclosed technology, "beam state" refers to at least one of quasi-co-location (QCL) state, transmission configuration indicator (TCI) state, spatial relation (also called as spatial relation information), reference signal (RS), spatial filter or precoding. In some implementations, "beam state" is also called as "beam." In some implementations, "Tx beam" refers to at least one of QCL state, TCI state, spatial relation state, DL reference signal, UL reference signal, Tx spatial filter or Tx precoding. In some implementations, "Rx beam" refers to at least one of QCL state, TCI state, spatial relation state, spatial filter, Rx spatial filter or Rx precoding. In some implementations, "beam ID" refers to at least one of QCL state index, TCI state index, spatial relation state index, reference signal index, spatial filter index or precoding index.

In some implementations of the disclosed technology, the spatial filter can be either UE-side or gNB-side one, and the spatial filter is also called as spatial-domain filter. In some implementations, "spatial relation information" includes one or more reference RSs, which is used to represent the same or quasi-co "spatial relation" between targeted "RS or channel" and the one or more reference RS s.

In some implementations, "spatial relation" refers to least one of the beam, spatial parameter, or spatial domain filter.

In some implementations, "QCL state" includes one or more reference RSs and their corresponding QCL type parameters, where QCL type parameters include at least one of the following aspect or combination: 1) Doppler spread, 2) Doppler shift, 3) delay spread, 4) average delay, 5) average gain, and 6) spatial parameter (which is also called as spatial Rx parameter). In some implementations, "TCI state" refers to "QCL state." In some implementations, 'QCL-TypeA' refers to {Doppler shift, Doppler spread, average delay, delay spread}, 'QCL-TypeB' refers to {Doppler shift, Doppler spread}, 'QCL-TypeC' refers to {Doppler shift, average delay}, and 'QCL-TypeD' refers to {Spatial Rx parameter}.

In some implementations, a RS comprises channel state information reference signal (CSI-RS), synchronization signal block (SSB) (which is also called as SS/PBCH), demodulation reference signal (DMRS), sounding reference signal (SRS), and physical random access channel (PRACH). Furthermore, the RS at least comprises DL reference signal and UL reference signalling. In some implementations, a DL RS comprises at least CSI-RS, SSB, or DMRS (e.g., DL DMRS). In some implementations, a UL RS comprises at least SRS, DMRS (e.g., UL DMRS), or PRACH.

In some implementations, "UL signal" can be PUCCH, PUSCH, or SRS. In some implementations, "DL signal" can be PDCCH, PDSCH, or CSI-RS.

In some implementations, the parameter(s) of TCI state can be configured by TCI state configuration, where the TCI state configurations of DL/UL joint and/or DL only can be configured by RRC (Radio Resource Control) parameter DLorJointTCIstate in RRC IE PDSCH-config, the TCI state configurations of UL only can be configured by RRC parameter UL-TCIState in RRC IE BWP-UplinkDedicated. In some implementations, the TCI state pool refers to a list of TCI state configurations. In some implementations, "component carrier (CC)" refers to serving cell, DL bandwidth part (BWP), or UL BWP. In some implementations, "CC group" refers to a group including one or more CC(s), and "CC list" refers to a list including one or more CC(s). In some implementations, "CORESET" refers to PDCCH or DCI. In some implementations, "CORESET group index" refers to the index of a group including one or more CORESET(s) and the CORESET group index can be configured by a higher layer configuration (e.g., CORESETPoolIndex). In some implementations, "transmission scheme" refers to at least one or any combination of STRP operation, MTRP operation, SFN manner, SDM scheme, TDM scheme, FDM scheme, single DCI (SDCI) based scheduling, or multi-DCI (MDCI) based scheduling.

In some implementations, the TRP ID(s) of a reference CC or a target CC can be determined by at least one of the following methods.

1) In some implementations, the TRP ID(s) can be determined by RRC signalling. The following options can be suggested.

a. In some implementations, multiple configured TCI state sets are configured in a channel/RS configuration, and each set corresponds to a TRP ID.

b. In some implementations, a configured TRP ID of the CORESET (e.g., the value of CORESETPoolIndex configured for the CORESET) in the CC corresponds to a TRP ID.

c. In some implementations, an indicator configured in a TCI state configuration is used to indicate the TRP ID. For example, the value of the indicator is 0 corresponds to the first TRP with ID=0, the value of the indicator is 1 corresponds to the second TRP with ID=1, and so on.

2) In some implementations, the TRP ID(s) can be determined by MAC CE signalling. The following options can be suggested.

a. In some implementations, the value of a field in the MAC CE corresponds to a TRP ID.

b. In some implementations, if the TCI state for a TCI codepoint is derived from the TCI state configuration of DL/UL joint, the order of TCI state ID in a TCI codepoint represents the TRP ID. For example, the lower TCI state ID in the TCI codepoint corresponds to the lower TRP ID, and the higher TCI state ID in the TCI state codepoint corresponds to the higher TRP ID.

c. In some implementations, if the TCI state for a TCI codepoint is derived from the TCI state configuration of DL only or UL only, the order of TCI state ID in a TCI codepoint represents the TRP ID, where all of the TCI states in a TCI codepoint are configured with the same TCI state configuration.

3) In some implementations, the TRP ID(s) can be determined by DCI signalling. The following options can be suggested.

a. In some implementations, if more than one TCI indication field are present in DCI, each TCI indication field corresponds to one TRP ID. For example, the first TCI indication field corresponds to the first TRP ID, the second TCI indication field corresponds to the second TRP ID, and so on.

b. In some implementations, only one TCI indication field is present in DCI.

a) In some implementations, if the TCI state in a TCI codepoint is derived from the TCI state configuration of DL/UL joint, the order of TCI state ID in a TCI codepoint represents the TRP ID. For example, the lower TCI state ID in the TCI codepoint corresponds to the lower TRP ID, and the higher TCI state ID in the TCI state codepoint corresponds to the higher TRP ID.

b) In some implementations, if the TCI state in a TCI codepoint is derived from the TCI state configuration of DL only or UL only, the order of TCI state ID in a TCI codepoint represents the TRP ID, where all of the TCI states in a TCI codepoint are configure with the same TCI state configuration.

c) In some implementations, TRP ID is indicated by a field in DCI explicitly. For example, the first value of this field corresponds to the first TRP ID, the first value of this field corresponds to the second TRP ID.

In some implementations, "indicate" is used to mean at least one of "activate", "configure", "allocate", or "demand." In some implementations, "indicate" is used to with its original meaning. In some implementations, the phrase, "A is associated with B," means that A and B have a direct or indirect relationship, i.e., that A (or B) can be determined according to B (or A).

Various implementations of the disclosed technology suggest deriving TCI state(s) of the target CC based on the TCI state configuration(s) from the reference CC, where the target CC and reference CC may be included in a CC group for CA operation and the transmission scheme of the target CC and reference CC are different from each other. To determine TCI state(s) of target CC, the following options can be applied:

Option 1: TCI state(s) of the target CC is derived from the TCI state configuration(s) with the same TRP ID in the reference CC, where TCI state(s) applies in the reference CC.

Option 2: TCI state(s) of the target CC is derived from the TCI state configuration(s) with the lowest TRP ID in the reference CC, where TCI state(s) applies in the reference CC.

Option 3: TCI state(s) of the target CC is derived from the TCI state configuration(s) with the lowest TCI state ID in the reference CC, where TCI state(s) applies in the reference CC.

Option 4: TCI state(s) of the target CC is derived from the TCI state configuration(s) which first received by the UE in the reference CC, where TCI state(s) applies in the reference CC.

Option 5: TCI state(s) of the target CC is derived from the TCI state configuration(s) in the reference CC where TCI state(s) does not apply.

Option 6: TCI state(s) of the target CC is not derived from the TCI state configuration(s) in the reference CC, if the TRP ID/transmission scheme/transmission operation of the target CC and the reference CC are different.

The Options 1-6 are will be applied to Implementations 1-4 as further discussed below.

Implementation 1

Upon satisfying at least one of certain conditions, the UE may obtain and apply the TCI state(s) for the target CC (CC #0) which is derived from the reference CC. At least one of certain conditions is satisfied in the following cases:

1) The UE is indicated to perform STRP operation in a target CC, which is denoted as CC #0.

2) The UE is indicated to perform CA operation in a CC group, where including CC #0.

3) The TCI state configurations of DL/UL joint, DL only, or UL only are absent in a BWP of CC #0.

4) The BWP ID (i.e. bwp-id) or cell ID (i.e. cell) for QCL-TypeA/D source RS in a QCL-information of the TCI state configured with DLorJointTCIstate is NOT provided to CC #0. The DLorJointTCIstate corresponds to the RRC parameter which is used to configured DL/UL joint TCI states and/or DL-only TCI states.

5) The TRP ID for QCL-TypeA/D source RS in a QCL-info of the TCI state configured with DLorJointTCIstate may NOT be provided to CC #0.

6) The number of TCI states indicated in CC #0 is less than the number of TCI states applied in a reference CC.

Upon satisfying at least one of the conditions 1) to 6) above, the UE may obtain and apply the TCI state(s) for CC #0 which is derived from the reference CC. At least QCL-Type A/D source RS applied in CC #0 is derived from the reference CC. If the source RS in the TCI state in the reference CC is QCL-Type A RS, the RS ID of the QCL-Type A source RS applied in CC #0 is the same as the RS ID of the QCL-Type A source RS applied in the reference CC. If the source RS in the TCI state in the reference is QCL-Type D RS, the QCL-Type D source RS applied in CC #0 is the same as the QCL-Type D source RS applied in the reference CC.

Implementation 1-1

In this implementation, the target CC is indicated to perform STRP operation and the reference CC (where TCI state(s) applies) is indicated to perform MTRP operation. In this case, the reference CC (denoted as CC #1) is indicated to perform the MTRP operation and the TCI state(s) applies to the reference CC.

In some implementations, CC #1 is included in a CC group which used for the UE to perform CA operation. In some implementations, the TCI state configuration(s) of DL/UL joint, DL only, or UL only are present in a BWP of CC #1. In some implementations, only CC #1 is configured with TCI state configurations and serves as the reference CC in the CC group which used for CA operation. In some implementations, if the UE applies multiple TCI states for CC #0 which derived from CC #1 and indicated with different TRP IDs, then the UE assumes that CC #0 is indicated as MTRP operation as in CC #1.

The following describes how the TCI state applies to the target CC.

1) In some implementations, if the TRP ID of CC #0 is the same as at least one of the TRP IDs of CC #1, the UE applies the TCI state(s) for CC #0 which derived from CC #1 and configured with the same TRP ID.

2) In some implementations, if the TRP ID of CC #0 is different from any one of the TRP IDs of CC #1, the UE does not expect to use the TCI state(s) for CC #0 which derived from CC #1.

3) In some implementations, the UE applies the TCI state(s) for CC #0 which is derived from CC #1 and configured with the lowest TRP ID as configured in CC #1.

4) In some implementations, the UE applies the TCI state(s) for CC #0 which can be derived from CC #1 and configured with lowest TCI state ID as configured in CC #1.

5) In some implementations, the UE applies the TCI state(s) for CC #0 which is derived from CC #1 and is the one(s) first received by the UE.

6) In some implementations, the UE doesn't expect to apply the TCI state(s) for CC #0 which is derived from CC #1.

Implementation 1-2

In this implementation, the target CC is indicated to perform STRP operation and the reference CC (denoted as CC #2) is different from CC #1 which is discussed above. CC #2 is configured to provide the TCI state(s) for CC #0 and the TCI state(s) may not apply to the reference CC.

Example 1: In Some Implementations, CC #2 is Indicated to Perform the STRP Operation In some implementations, CC #2 may not be included in the CC group which used for the UE to perform CA operation. In some implementations, the TCI state configuration(s) of DL/UL joint, DL only, or UL only are present in a BWP of CC #2. In some implementations, the transmission scheme of CC #2 is same as the transmission scheme of CC #0.

The following describes how the TCI state applies to the target CC.

1) In some implementations, if the TRP ID of CC #2 or CC #0 can be obtained by the UE, the UE expects the TRP ID of CC #2 is the same as the TRP ID of CC #0.

2) In some implementations, if the TRP ID of CC #2 is different from the TRP ID of CC #0, the UE doesn't expect to apply the TCI state(s) for CC #0 which derived from the CC #2.

3) In some implementations, if the TRP ID of CC #2 or CC #0 cannot be obtained by the UE, the UE can apply the TCI state(s) for CC #0 which derived from the CC #2.

4) In some implementations, the UE applies the TCI state(s) for CC #0 which can be derived from CC #2 and configured with lowest TCI state ID as configured in CC #2.

5) In some implementations, the UE applies the TCI state(s) for CC #0 which is derived from CC #2 and is the one(s) first received by the UE.

6) In some implementations, CC #2 and CC #0 are configured in a CC list, where CC #2 is used as the reference CC of each CC in the CC list.

Option 1: Each CC in the CC list is indicated as the same TRP ID.

Option 2: Each CC in the CC list is indicated as the same transmission scheme.

Option 3: Each CC in the CC list is indicated as the STRP operation.

Example 2: In Some Implementations, CC #2 is Indicated to Perform MTRP Operation 1) In some implementations, CC #2 may not be included in the CC group which used for the UE to perform CA operation.

2) In some implementations, the TCI state configuration(s) of DL/UL joint, DL only, or UL only are present in a BWP of CC #2.

3) In some implementations, if the TRP ID of CC #0 is the same as at least one of the TRP IDs of CC #2, the UE applies the TCI state(s) for CC #0 which derived from CC #2 and configured with the same TRP ID.

4) In some implementations, if the TRP ID of CC #0 is different from all of the TRP IDs of CC #2, the UE does not expect to use the TCI state(s) for CC #0 which derived from CC #2.

5) In some implementations, the UE applies the TCI state(s) for CC #0 which derived from CC #2 and configured with the lowest TRP ID in CC #2.

6) In some implementations, the UE applies the TCI state(s) for CC #0 which can be derived from CC #2 and configured with lowest TCI state ID in CC #2.

7) In some implementations, the UE applies the TCI state(s) for CC #0 which is derived from CC #2 and is the one(s) first received by the UE.

8) In some implementations, CC #2 and CC #0 are configured in a CC list, where CC #2 is used as the reference CC of each CC in the CC list.

Option 1: At least one of the TRP IDs configured in CC #2 should be the same as the TRP ID(s) of each CC in the CC list.

Option 2: At least one of the transmission schemes configured in CC #2 should be the same as the transmission scheme(s) of each CC in the CC list.

9) In some implementations, the UE doesn't expect to apply the TCI state(s) for CC #0 which derived from CC #2.

10) In some implementations, if the UE applies multiple TCI states for CC #0 which is derived from CC #2 and indicated with different TRP IDs, then the UE assumes that CC #0 is indicated as MTRP operation as in CC #2.

Implementation 1-3

In this implementation, a set of TCI state configuration(s) is individually configured for CC #0, and then the UE derives the TCI state(s) from the TCI state configuration(s) set for STRP operation.

Implementation 2

Upon satisfying at least one of certain conditions the UE may obtain and apply the TCI state(s) for the target CC (CC #0) which is derived from the reference CC. At least one of certain conditions is satisfied in the following cases:

1) The UE is indicated to perform STRP operation in a target CC, which is denoted as CC #0.

2) The UE is indicated to perform CA operation in a CC group, where including CC #0.

3) The TCI state configurations of DL/UL joint, DL only, or UL only are absent in a BWP of CC #0.

4) The BWP ID (i.e. bwp-id) or cell ID (i.e. cell) for QCL-TypeA/D source RS in a QCL-info of the TCI state configured with DLorJointTCIstate is NOT provided to CC #0.

5) The TRP ID for QCL-TypeA/D source RS in a QCL-info of the TCI state configured with DLorJointTCIstate may NOT be provided to CC #0.

6) The number of TCI states indicated in CC #0 is less than the number of TCI states applied in a reference CC.

Upon satisfying at least one of the conditions 1) to 6) above, the UE may obtain and apply the TCI state(s) for CC #0 which is derived from the reference CC. At least QCL-TypeA/D source RS applied in CC #0 is derived from the reference CC. If the source RS in the TCI state in the reference CC is QCL-Type A RS, the RS ID of the QCL-TypeA source RS applied in CC #0 is the same as the RS ID of the QCL-TypeA source RS applied in the reference CC. If the source RS in the TCI state in the reference is QCL-Type D RS, the QCL-Type D source RS applied in CC #0 is the same as the QCL-Type D source RS applied in the reference CC.

Implementation 2-1

In this implementation, the target CC is indicated to perform STRP operation and reference CC (where TCI state(s) applies) is indicated to perform STRP operation. In this case, the reference CC is a CC (denoted as CC #1) which is indicated as STRP operation and the TCI state(s) applies to the reference CC.

In some implementations, CC #1 is included in a CC group which used for the UE to perform CA operation. In some implementations, the TCI state configuration(s) of DL/UL joint, DL only, or UL only are present in a BWP of CC #1. In some implementations, only CC #1 is configured with TCI state configurations and serves as the reference CC in the CC group which used for CA operation.

The following describes how the TCI state applies to the target CC.

1) In some implementations, if the TRP ID of CC #0 is different from the TRP ID indicated in CC #1, the UE does not expect to use the TCI state(s) for CC #0 which derived from CC #1.

2) In some implementations, the UE applies the TCI state(s) for CC #0 which can be derived from CC #1 and configured with lowest TCI state ID in CC #1.

3) In some implementations, the UE applies the TCI state(s) for CC #0 which is derived from CC #1 and is the one(s) first received by the UE.

4) In some implementations, the UE doesn't expect to apply the TCI state(s) for CC #0 which derived from CC #1.

Implementation 2-2

In this implementation, the target CC is indicated to perform STRP operation and the reference CC is (denoted as CC #2) different from CC #1 which is discussed for Implementation 2-1. CC #2 is configured to provide the TCI state(s) for CC #0, where the TCI state(s) may not apply to the reference CC.

Example 1: The descriptions regarding Implementation 1-2, Example 1 are applied hereto. The same descriptions will not be repeated to avoid redundancy and improve brevity.

Example 2: In some implementations, CC #2 is indicated as MTRP operation.

The descriptions regarding items 1) to 10) as discussed for Implementation 1-2, Example 2 are applied hereto.

Implementation 2-3

In this implementation, a set of TCI state configuration(s) is individually configured for CC #0, and then the UE derives the TCI state(s) from the TCI state configuration(s) set for STRP operation.

Implementation 3

Upon satisfying a certain condition, the UE may obtain and apply the TCI state(s) for the target CC (CC #0) which is derived from the reference CC. The certain condition is satisfied in the following cases:

1) The UE is indicated to perform MTRP operation in a CC, which is denoted as CC #0.

2) The UE is indicated to perform CA operation in a CC group, where including CC #0.

3) The TCI state configurations of DL/UL joint, DL only, or UL only are absent in a BWP of CC #0.

4) A set of TCI state configurations of DL/UL joint, DL only, or UL only, which associated with a TRP ID, is absent in a BWP of CC #0.

5) The BWP ID (i.e. bwp-id) or cell ID (i.e. cell) for QCL-TypeA/D source RS in a QCL-info of the TCI state configured with DLorJointTCIstate is NOT provided to CC #0.

6) The TRP ID for QCL-TypeA/D source RS in a QCL-info of the TCI state configured with DLorJointTCIstate is not provided to CC #0.

7) The number of TCI states indicated in CC #0 is more than the number of TCI states applied in a reference CC.

Upon satisfying at least one of the conditions 1) to 6) above, the UE may obtain and apply the TCI state(s) for CC #0 which is derived from the reference CC. In this case, at least QCL-Type A/D source RS applied in CC #0 is derived from the reference CC. If the source RS in the TCI state in the reference CC is QCL-Type A RS, the RS ID of the QCL-Type A source RS applied in CC #0 is the same as the RS ID of the QCL-Type A source RS applied in the reference CC. If the source RS in the TCI state in the reference is QCL-Type D RS, the QCL-Type D source RS applied in CC #0 is the same as the QCL-Type D source RS applied in the reference CC.

Implementation 3-1

In this implementation, the target CC is indicated to perform MTRP operation and the reference CC (where TCI state(s) applies) is indicated to perform STRP operation. In this case, the reference CC (denoted as CC #1) is indicated to perform STRP operation and the TCI state(s) applies to the reference CC.

In some implementations, CC #1 is included in a CC group which used for the UE to perform CA operation. In some implementations, the TCI state configuration(s) of DL/UL joint, DL only, or UL only are present in a BWP of CC #1. In some implementations, only CC #1 is configured with TCI state configurations and serves as the reference CC in the CC group which used for CA operation.

The following describes how the TCI state applies to the target CC.

1) In some implementations, if at least one of the TRP ID(s) of CC #0 is the same the TRP ID of CC #1, the UE applies the TCI state(s) for CC #0 which derived from CC #1 and configured with the same TRP ID only. If the UE applies only one TCI state derived from CC #1, the UE assumes that CC #0 is indicated as STRP operation as in CC #1.

2) In some implementations, if all of the TRP ID(s) of CC #0 are different from the TRP ID of CC #1, the UE does not expect to apply the TCI state(s) for CC #0 which derived from CC #1.

3) In some implementations, the UE applies the TCI state(s) for CC #0 which is derived from CC #1 and configured with the TRP ID in CC #1, no matter the TRP ID(s) in CC #0 is same as or different from the TRP ID in CC #2.

4) In some implementations, the UE applies the TCI state(s) for CC #0 which is derived from CC #1 and configured with lowest TCI state ID in CC #1.

5) In some implementations, the UE applies the TCI state(s) for the first and second TRP IDs in CC #0 which derived from CC #1 and configured with the first and second lowest TCI state IDs in CC #1.

6) In some implementations, the UE applies the TCI state(s) for CC #0 which is derived from CC #1 and is the one(s) firstly received by the UE.

7) In some implementations, the UE applies the TCI states for the first and second TRP IDs in CC #0 which are derived from CC #1 and are firstly and secondly received by the UE.

8) In some implementations, the UE doesn't expect to apply the TCI state(s) for CC #0 which derived from CC #1.

Implementation 3-2

In this implementation, the target CC is indicated to perform MTRP operation and the UE expects the reference CC to be CC #0 rather than CC #1. In this case, TCI state configuration(s) is present in CC #0 and then the TCI state(s) applies to the reference CC.

Implementation 3-2

In this case, the target CC is indicated to perform MTRP operation and the reference CC (denoted as CC #2) is different from CC #1 which is discussed above. CC #2 is configured to provide the TCI state(s) for CC #0 and the TCI state(s) may not apply to the reference CC.

Example 1: In Some Implementations, CC #2 is Indicated to Perform the MTRP Operation In some implementations, CC #2 may not be included in the CC group which used for the UE to perform CA operation.

In some implementations, the TCI state configuration(s) of DL/UL joint, DL only, or UL only are present in a BWP of CC #2.

The following describes how the TCI state applies to the target CC.

1) In some implementations, if at least one the TRP IDs of CC #0 is the same as at least one of the TRP IDs of CC #2, the UE applies the TCI state(s) for CC #0 which derived from CC #2 and configured with the same TRP ID(s).

2) In some implementations, if all of the TRP IDs of CC #0 are different from any one of the TRP IDs of CC #2, the UE does not expect to use the TCI state(s) for CC #0 which derived from CC #2.

3) In some implementations, the UE applies the TCI state(s) for CC #0 which derived from CC #2 and configured with different TRP IDs in CC #2, no matter the TRP ID(s) in CC #0 is same as or different from the TRP ID(s) in CC #2.

4) In some implementations, the UE applies the TCI state(s) for CC #0 which can be derived from CC #2 and configured with the lowest TCI state IDs of each TRP ID as configured in CC #2.

5) In some implementations, the UE applies the TCI state(s) for CC #0 which derived from CC #2 and is the one(s) corresponding to each TRP ID firstly received by the UE.

6) In some implementations, CC #2 and CC #0 are configured in a CC list, where CC #2 is used as the reference CC of each CC in the CC list.

Option 1: Each CC in the CC list is indicated with the same TRP ID(s).

Option 2: Each CC in the CC list is indicated as the same transmission scheme.

Option 3: Each CC in the CC list is indicated as the MTRP operation.

Example 2: In Some Implementations, CC #2 is Indicated to Perform STRP Operation 1) In some implementations, CC #2 may not be included in the CC group which used for the UE to perform CA operation.

2) In some implementations, the TCI state configuration(s) of DL/UL joint, DL only, or UL only are present in a BWP of CC #2.

3) In some implementations, if the UE applies only one TCI state for CC #0 which derived from CC #2, then the UE assumes that CC #0 is indicated as STRP operation as in CC #2.

4) In some implementations, CC #2 and CC #0 are configured in a CC list, where CC #2 is used as the reference CC of each CC in the CC list. In some implementations, the TRP ID indicated in CC #2 should be the same as at least one of the TRP ID(s) of each CC in the CC list.

5) In some implementations, if the TRP ID of CC #2 or CC #0 can be obtained by the UE, the UE expects the TRP ID of CC #2 is the same as at least one of the TRP IDs of CC #0. In some implementations, if the TRP ID of CC #2 is different from all of the TRP IDs of CC #0, the UE doesn't expect to apply the TCI state(s) for CC #0 which derived from the CC #2.

6) In some implementations, if the TRP ID of CC #2 or CC #0 cannot be obtained by the UE, the UE can apply the TCI state(s) for CC #0 which derived from the CC #2.

7) In some implementations, the UE applies the TCI state(s) for CC #0 which can be derived from CC #2 and configured with lowest TCI state ID in CC #2.

8) In some implementation, the UE applies the TCI state(s) for CC #0 which derived from CC #2 and is the one(s) first received by the UE.

9) In some implementations, the UE doesn't expect to apply the TCI state(s) for CC #0 which derived from CC #2.

Implementation 3-4

In this implementation, more than one sets of TCI state configuration(s) are individually configured for CC #0, and then the UE derives the TCI state(s) from the TCI state configuration(s).

Implementation 4

Upon satisfying at least one of certain conditions, the UE may obtain and apply the TCI state(s) for the target CC (CC #0) which is derived from the reference CC. At least one of certain conditions is satisfied in the following cases:

1) The UE is indicated to perform MTRP operation in a target CC, which is denoted as CC #0.

2) The UE is indicated to perform CA operation in a CC group, where including CC #0.

3) The TCI state configurations of DL/UL joint, DL only, or UL only are absent in a BWP of CC #0.

4) A set of TCI state configurations of DL/UL joint, DL only, or UL only, which associated with a TRP ID, is absent in a BWP of CC #0.

5) The BWP ID (i.e. bwp-id) or cell ID (i.e. cell) for QCL-TypeA/D source RS in a QCL-info of the TCI state configured with DLorJointTCIstate is NOT provided to CC #0.

6) The TRP ID for QCL-TypeA/D source RS in a QCL-info of the TCI state configured with DLorJointTCIstate is not provided to CC #0.

7) The number of TCI states indicated in CC #0 is more than the number of TCI states applied in a reference CC.

Upon satisfying at least one of the conditions 1) to 7), the UE may obtain and apply the TCI state(s) for CC #0 which is derived from the reference CC. In this case, at least QCL-Type A/D source RS applied in CC #0 is derived from the reference CC. If the source RS in the TCI state in the reference CC is QCL-Type A RS, the RS ID of the QCL-Type A source RS applied in CC #0 is the same as the RS ID of the QCL-Type A source RS applied in the reference CC. If the source RS in the TCI state in the reference is QCL-Type D RS, the QCL-Type D source RS applied in CC #0 is the same as the QCL-Type D source RS applied in the reference CC.

Implementation 4-1

In this implementation, the target CC is indicated to perform MTRP operation and the reference CC (where TCI state(s) applies) is indicated to perform MTRP operation. In this case, the reference CC (denoted as CC #1) is indicated to perform MTRP operation and the TCI state(s) applies to the reference CC.

In some implementations, CC #1 is included in a CC group which used for the UE to perform CA operation. In some implementations, The TCI state configuration(s) of DL/UL joint, DL only, or UL only are present in a BWP of CC #1. In some implementations, only CC #1 is configured with TCI state configurations and serves as the reference CC in the CC group which used for CA operation.

The following describes how the TCI state applies to the target CC.

1) In some implementations, if at least one of the TRP ID(s) of CC #0 is same as at least one of the TRP IDs of CC #1. In some examples, the UE applies the TCI state(s) for CC #0 which is derived from CC #1 and indicated with the same TRP ID(s).

2) In some implementations, if all of the TRP ID(s) of CC #0 are different from any one of the TRP IDs of CC #1, the UE does not expect to use the TCI state(s) for CC #0 which is derived from CC #1.

3) In some implementations, the UE applies the TCI state(s) for CC #0 which is derived from CC #1 and configured with the TRP IDs as indicated in CC #1.

4) In some implementations, the UE applies the TCI state(s) for CC #0 which is derived from CC #1 and configured with lowest TCI state ID of each TRP ID in CC #1.

5) In some implementations, the UE applies the TCI state(s) for CC #0 which is derived from CC #1 and is the one(s) corresponding to each TRP ID first received by the UE.

6) In some implementations, the UE doesn't expect to apply the TCI state(s) for CC #0 which is derived from CC #1.

Implementation 4-2

In this case, the target CC is indicated to perform the MTRP operation and the reference CC (denoted as CC #2) is different from CC #1 which is discussed above. CC #2 is configured to provide the TCI state(s) for CC #0 and the TCI state(s) may not apply to the reference CC.

Example 1: In Some Implementations, CC #2 is Indicated to Perform the MTRP Operation In some implementations, CC #2 may not be included in the CC group which used for the UE to perform CA operation.

In some implementations, the TCI state configuration(s) of DL/UL joint, DL only, or UL only are present in a BWP of CC #2.

In some implementations, CC #2 and CC #0 are configured in a CC list, where CC #2 is used as the reference CC of each CC in the CC list.

Option 1: Each CC in the CC list is indicated with the same TRP ID(s).

Option 2: Each CC in the CC list is indicated as the same transmission scheme.

Option 3: Each CC in the CC list is indicated as the MTRP operation.

The following describes how the TCI state applies to the target CC.

1) In some implementations, if any one the TRP IDs in CC #0 is the same as any one of the TRP IDs in CC #2, the UE applies the TCI state(s) for CC #0 which derived from CC #2 and configured with the same TRP ID(s).

2) In some implementations, if all of the TRP IDs of CC #0 are different from any one of the TRP IDs of CC #2, the UE does not expect to use the TCI state(s) for CC #0 which derived from CC #2.

3) In some implementations, the UE applies the TCI state(s) for CC #0 which derived from CC #2 and configured with different TRP IDs in CC #2, no matter the TRP ID(s) in CC #0 is same as or different from the TRP ID(s) in CC #2.

4) In some implementations, the UE applies the TCI state(s) for CC #0 which can be derived from CC #2 and configured with the first lowest TCI state ID of each TRP ID as configured in CC #2.

5) In some implementations, the UE applies the TCI state(s) for CC #0 which derived from CC #2 and is the one(s) corresponding to each TRP ID first received by the UE.

Example 2: In Some Implementations, CC #2 is Indicated to Perform the STRP Operation 1) In some implementations, CC #2 may not be included in the CC group which used for the UE to perform CA operation.

2) In some implementations, the TCI state configuration (s) of DL/UL joint, DL only, or UL only are present in a BWP of CC #2.

3) In some implementations, if the UE applies only one TCI state derived from CC #2, the UE assumes that CC #0 is indicated as STRP operation in CC #2.

4) In some implementations, CC #2 and CC #0 are configured in a CC list, where CC #2 is used as the reference CC of each CC in the CC list. In some examples, the TRP ID indicated in CC #2 should be the same as at least one of the TRP ID(s) of each CC in the CC list.

5) In some implementations, if the TRP ID of CC #2 or CC #0 can be obtained by the UE, the UE expects the TRP ID of CC #2 is the same as at least one of the TRP IDs of CC #0. In some examples, if the TRP ID of CC #2 is different from any one of the TRP IDs of CC #0, the UE doesn't expect to apply the TCI state(s) for CC #0 which derived from the CC #2.

6) In some implementations, if the TRP ID of CC #2 or CC #0 cannot be obtained by the UE, the UE can apply the TCI state(s) for CC #0 which derived from the CC #2.

7) In some implementations, the UE applies the TCI state(s) for CC #0 which can be derived from CC #2 and configured with lowest TCI state ID as configured in CC #2.

8) In some implementations, the UE applies the TCI state(s) of the first and second TRP IDs for CC #0 which can be derived from CC #2 and configured with the first and second lowest TCI state IDs as configured in CC #2.

9) In some implementation, the UE applies the TCI state(s) for CC #0 which derived from CC #2 and is the one(s) firstly received by the UE.

10) In some implementations, the UE applies the TCI state(s) of the first and second TRP IDs for CC #0 which derived from CC #2 and is the one(s) first and second received by the UE.

11) In some implementations, the UE expects that the reference CC should be CC #0 rather than CC #2, where TCI state configuration(s) should be present in CC #0 and then the TCI state(s) applies.

Implementation 4-3

In this implementation, more than one sets of TCI state configuration(s) are individually configured for CC #0, and then the UE derives the TCI state(s) from the TCI state configuration(s).

Figure 2:
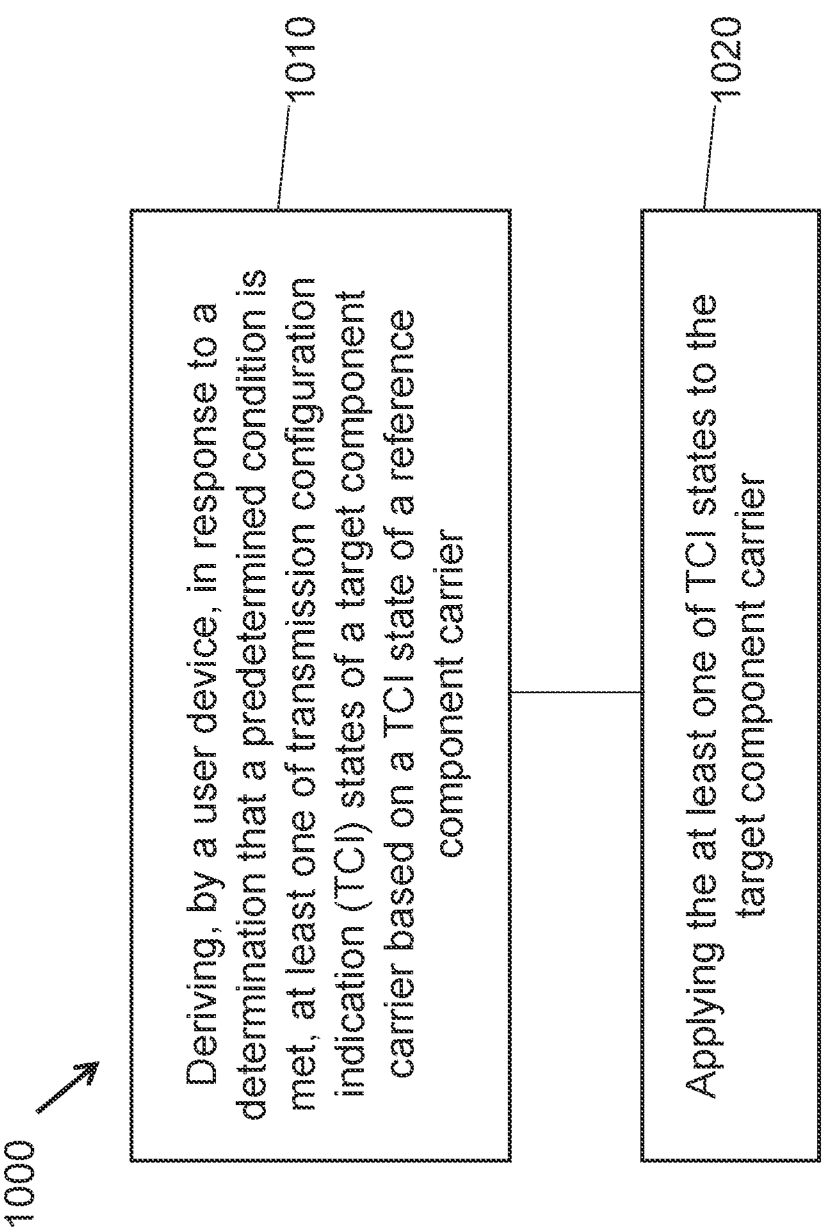
FIGS. 2 and 3 illustrate flowcharts showing example methods of wireless communication based on some implementations of the disclosed technology.

FIG. 2 illustrates a flowchart showing another example method of wireless communication based on some implementations of the disclosed technology. The method 1000 includes, at operation 1010, deriving, by a user device, in response to a determination that a predetermined condition is met, at least one of transmission configuration indication (TCI) states of a target component carrier based on a TCI state of a reference component carrier. The method 1000 further includes, at operation 1020, applying the at least one of TCI states to the target component carrier.

In some implementations, a TRP (transmission reception point) ID of the target component carrier or the reference component carrier is determined by a RRC (Radio Resource Control), MAC CE (control element), or a DCI (downlink control information). In some implementations, the TRP ID corresponds to i) a plurality of configured TCI state sets are configured in a channel configuration or reference signal (RS) configuration, ii) a configured TRP ID of a CORESET in the target component carrier or the reference component carrier, or iii) an indicator configured in a TCI state configuration. In some implementations, i) the TRP ID corresponds to a value of a field in the MAC CE or ii) the TRP ID is represented by an order of TCI state ID in a TCI codepoint in a case that a TCI state for a TCI codepoint is derived from a TCI state configuration of a downlink-uplink joint or from a TCI state configuration of downlink only or uplink only. In some implementations, i) the TRP ID corresponds to a TCI indication field present in the DCI, ii) the TRP ID is represented by an order of TCI state ID in a TCI codepoint in a case that a TCI state for a TCI codepoint is derived from a TCI state configuration of downlink-uplink joint or from a TCI state configuration of downlink only or uplink only or the TRP ID, or iii) the TRIP ID is indicated by a field in the DCI.

In some implementations, the predetermined condition is at least one of i) the user device is indicated to perform a STRP operation or the MTRP operation in the target component carrier, ii) the user device is indicated to perform a carrier aggregation (CA) operation in the carrier component group including the target CC, iii) TCI state configurations of a downlink-uplink joint, a downlink only, or an uplink only are absent or not configured in a bandwidth part (BWP) of the target component carrier, iv) a BWP ID or cell ID for a QCL-Type A or D source RS in a QCL-information of a TCI state configured with DLorJointTCIstate is not provided to the target component carrier, v) a TRP ID for the QCL-Type A or D source RS is not provided to the target component carrier, or vi) a number of TCI states indicated in the target component carrier is not equivalent to a number of TCI states configured in the reference component carrier in a case that the target carrier component is indicated to perform the STRP operation or the number of TCI states indicated in the target component carrier is equivalent to the number of TCI states configured in the reference component carrier in a case that the target carrier component is indicated to perform the MTRP operation.

In some implementations, a TCI state of the target carrier component is derived from a TCI state configuration with a same TRP ID in the reference CC to which the TCI state applies. In some implementations, a TCI state of the target carrier component is derived from TCI state configuration with a lowest TRP ID in the reference CC to which the TCI state applies. In some implementations, a TCI state of the target carrier component is derived from a TCI state configuration with a lowest TCI state ID in the reference carrier component to which the TCI state applies. In some implementations, a TCI state of the target carrier component is derived from a TCI state configuration firstly received by the user device in the reference carrier component to which the TCI state applies. In some implementations, a TCI state of the target carrier component is derived from a TCI state configuration in the reference CC to which the TCI state does not apply. In some implementations, a TCI state of the target carrier component is not derived from a TCI state configuration in the reference CC in case that TRP IDs or transmission schemes or transmission operations of the target carrier component and the reference carrier component are different.

In some implementations, the target component carrier is indicated to perform a single-TRP (STRP) operation and the reference component carrier is indicated to perform a multiple-TRP (MTRP) operation, wherein the target component carrier and the reference component carrier are indicated to perform the MTRP operation, wherein the target component carrier is indicated to perform the MTRP operation and the reference component carrier is indicated to perform the STRP operation, or wherein the target component carrier and the reference component carrier are indicated to perform the STRP operation. In some implementations, a QCL-Type A source RS applied in the target component carrier is same as RS ID of a QCL-Type A source RS applied in the reference target component carrier. In some implementations, a QCL-Type D source RS applied in the target component carrier is same as a QCL-Type D source RS applied in the reference component carrier. In some implementations, the reference component carrier is indicated to perform the MTRP operation or the STRP operation and the TCI state applies to the reference CC. In some implementations, the reference component carrier is included in a carrier component group used for the user device to perform a carrier aggregation (CA) operation or wherein a TCI state configuration of a downlink-uplink joint, downlink only, or uplink only is presented in a BWP of the reference component carrier. In some implementations, the reference component carrier is only reference component configured with TCI state configuration. In some implementations, the reference component carrier is configured to provide the TCI state for the target component carrier and the TCI state does not apply to the reference component carrier. In some implementations, the deriving derives multiple TCI states including the TCI state and having respective TRP ID s.

Figure 3:
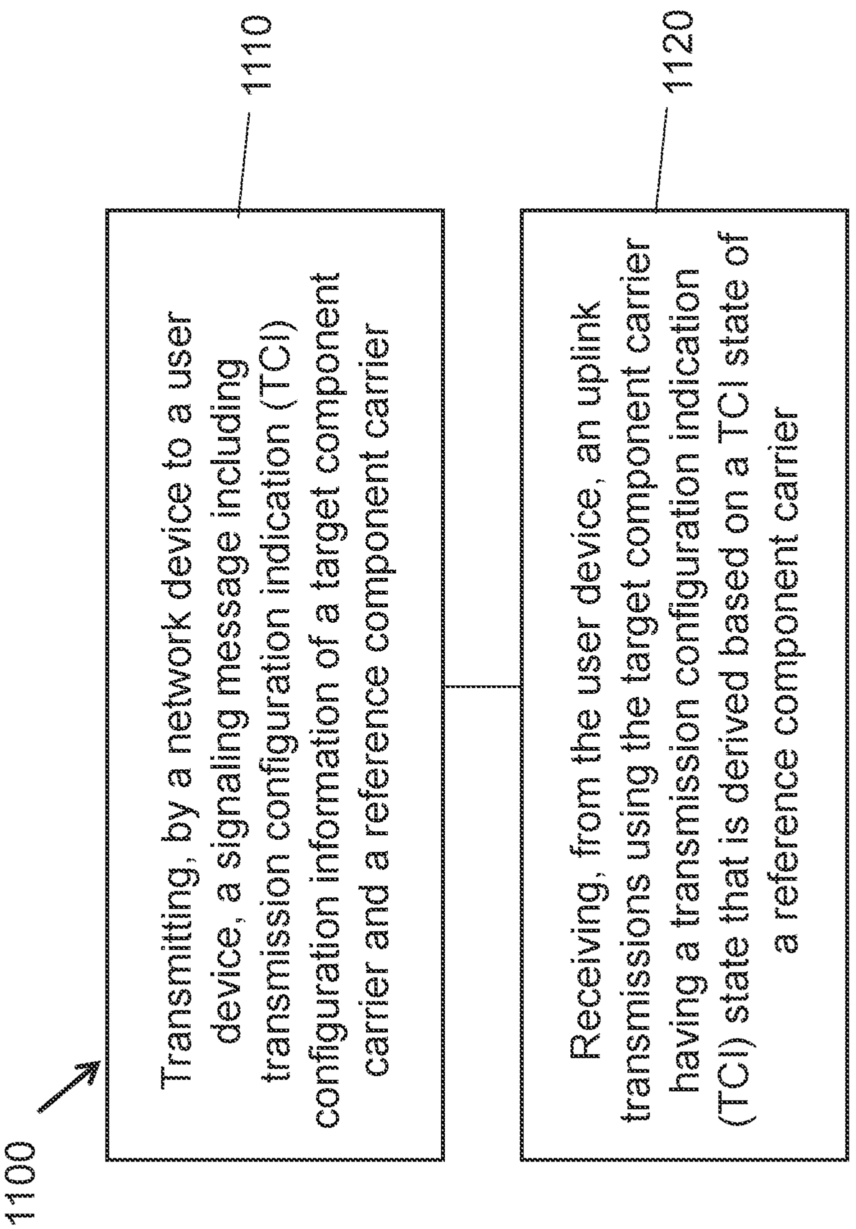

FIG. 3 illustrates a flowchart showing another example method of wireless communication based on some implementations of the disclosed technology. The method 1100 includes, at operation 1110, transmitting, by a network device to a user device, a signaling message including transmission configuration indication (TCI) configuration information of a target component carrier and a reference component carrier. The method 1100 includes, at operation 1120, receiving, from the user device, an uplink transmissions using the target component carrier having a transmission configuration indication (TCI) state that is derived based on a TCI state of a reference component carrier. Some descriptions which are discussed above for the UE may be applicable to the network device as well.

Figure 4:
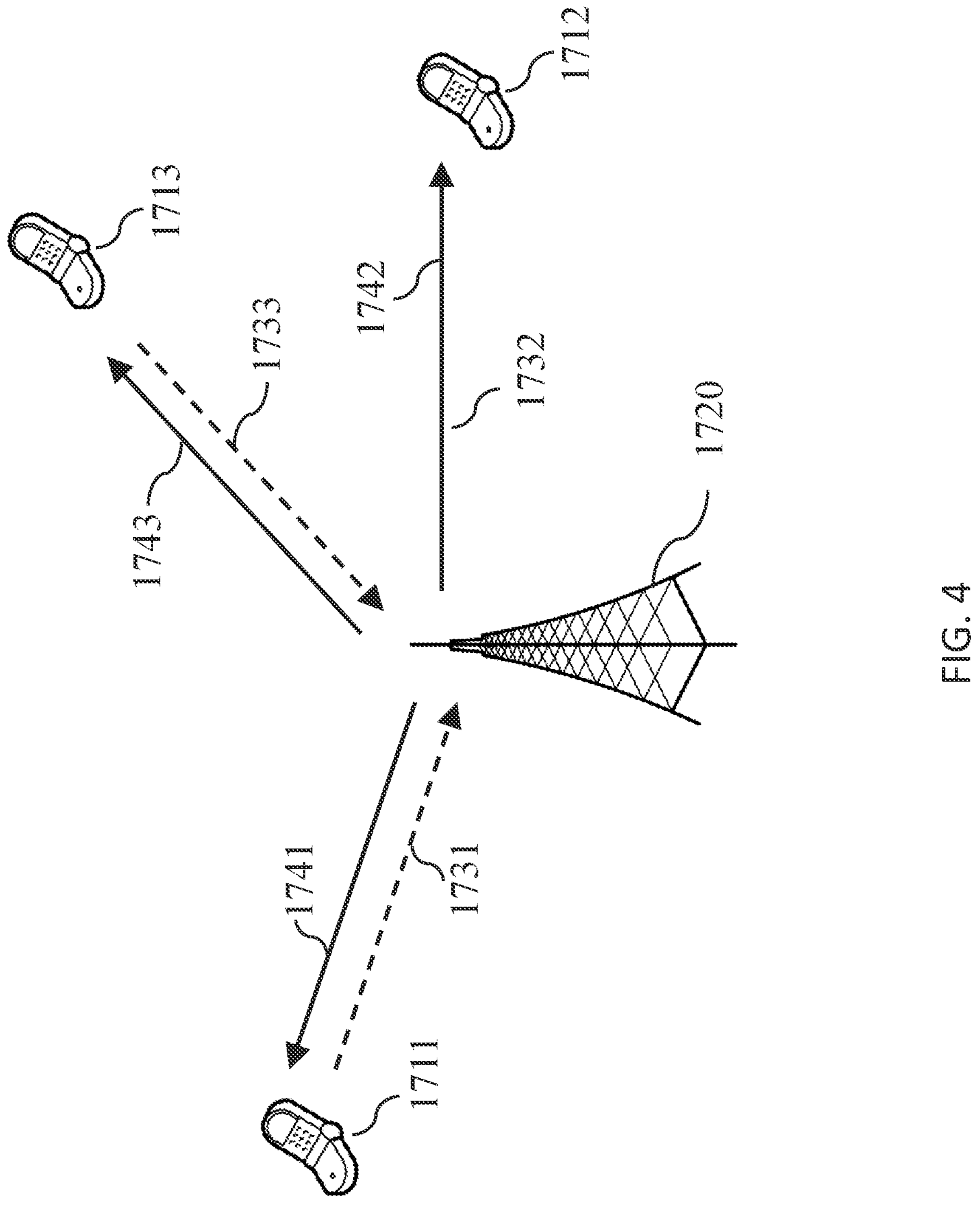
FIG. 4 shows an example of wireless communication including a base station (BS) and user equipment (UE) based on some implementations of the disclosed technology.

The implementations as discussed above will apply to a wireless communication. FIG. 4 shows an example of a wireless communication system (e.g., a 5G or NR cellular network) that includes a base station 1720 and one or more user equipment (UE) 1711, 1712 and 1713. In some embodiments, the UEs access the BS (e.g., the network) using implementations of the disclosed technology 1731, 1732, 1733), which then enables subsequent communication (1741, 1742, 1743) from the BS to the UEs. The UE may be, for example, a smartphone, a tablet, a mobile computer, a machine to machine (M2M) device, an Internet of Things (IoT) device, and so on.

Figure 5:
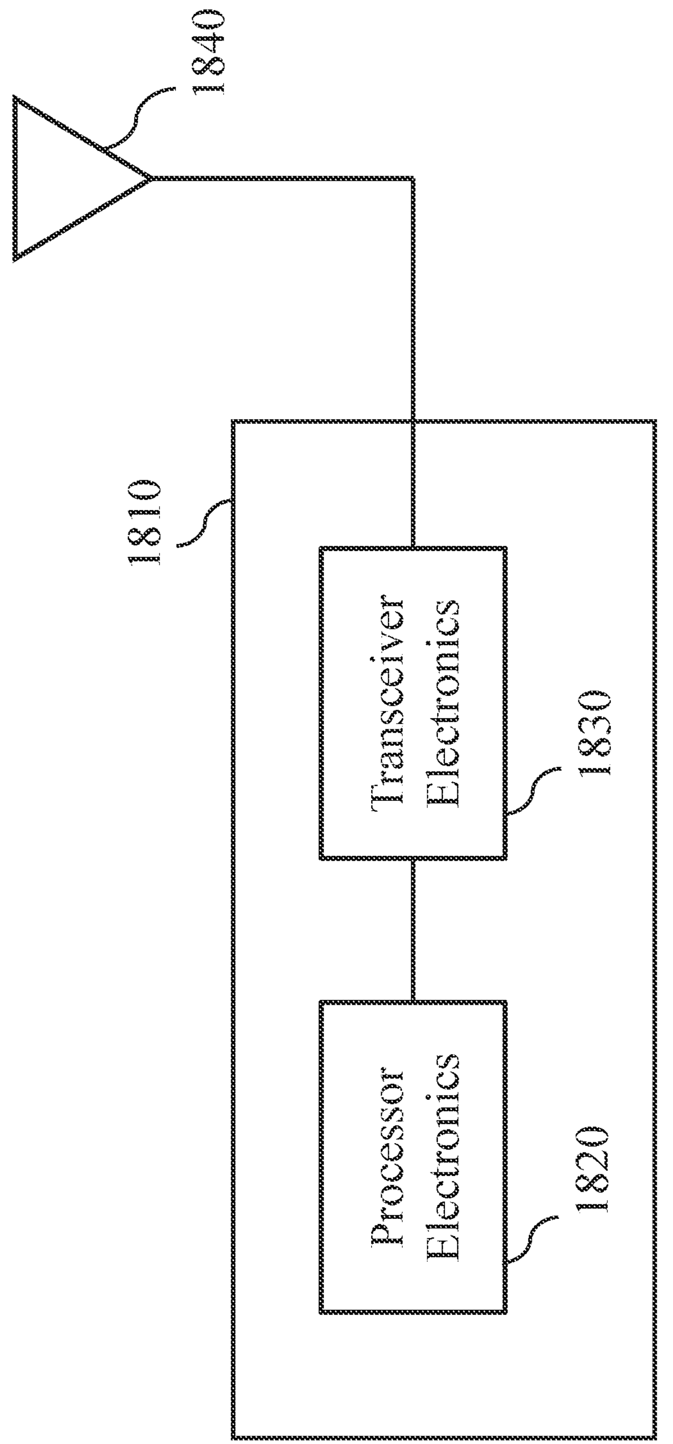
FIG. 5 shows an example of a block diagram of a portion of an apparatus based on some implementations of the disclosed technology.

FIG. 5 shows an example of a block diagram representation of a portion of an apparatus. An apparatus 1810 such as a base station or a user device which may be any wireless device (or UE) can include processor electronics 1820 such as a microprocessor that implements one or more of the techniques presented in this document. The apparatus 1810 can include transceiver electronics 1830 to send and/or receive wireless signals over one or more communication interfaces such as antenna 1840. The apparatus 1810 can include other communication interfaces for transmitting and receiving data. The apparatus 1810 can include one or more memories (not explicitly shown) configured to store information such as data and/or instructions. In some implementations, the processor electronics 1820 can include at least a portion of transceiver electronics 1830. In some embodiments, at least some of the disclosed techniques, modules or functions are implemented using the apparatus 1810.

It is intended that the specification, together with the drawings, be considered exemplary only, where exemplary means an example and, unless otherwise stated, does not imply an ideal or a preferred embodiment. As used herein, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of wireless communication, comprising:

deriving, by a user device, in response to a determination that a predetermined condition is met, at least one of transmission configuration indication (TCI) states of a target component carrier based on a TCI state of a reference component carrier; and applying the at least one of TCI states to the target component carrier, wherein the reference component carrier is configured to provide the TCI state for the target component carrier and the TCI state does not apply to the reference component carrier.

2. The method of claim 1, wherein a TRP (transmission reception point) ID of the target component carrier or the reference component carrier is determined by a RRC (Radio Resource Control), MAC CE (control element), or a DCI (downlink control information).

3. The method of claim 2, wherein the TRP ID corresponds to i) a plurality of configured TCI state sets are configured in a channel configuration or reference signal (RS) configuration, ii) a configured TRP ID of a CORESET in the target component carrier or the reference component carrier, or iii) an indicator configured in a TCI state configuration.

4. The method of claim 2, wherein i) the TRP ID corresponds to a value of a field in the MAC CE or ii) the TRP ID is represented by an order of TCI state ID in a TCI codepoint in a case that a TCI state for a TCI codepoint is derived from a TCI state configuration of a downlink-uplink joint or from a TCI state configuration of downlink only or uplink only.

5. The method of claim 2, wherein i) the TRP ID corresponds to a TCI indication field present in the DCI, ii) the TRP ID is represented by an order of TCI state ID in a TCI codepoint in a case that a TCI state for a TCI codepoint is derived from a TCI state configuration of downlink-uplink joint or from a TCI state configuration of downlink only or uplink only or the TRP ID, or iii) the TRP ID is indicated by a field in the DCI.

6. The method of claim 1, wherein the predetermined condition is at least one of i) the user device is indicated to perform a single-TRP (STRP) operation or a multiple-TRP (MTRP) operation in the target component carrier (CC), ii) the user device is indicated to perform a carrier aggregation (CA) operation in a carrier component group including the target CC, iii) TCI state configurations of a downlink-uplink joint, a downlink only, or an uplink only are absent or not configured in a bandwidth part (BWP) of the target component carrier, iv) a BWP ID or cell ID for a QCL-Type A or D source RS in a QCL-information of a TCI state configured with DLorJointTCIstate is not provided to the target component carrier, v) a TRP ID for the QCL-Type A or D source RS is not provided to the target component carrier, or vi) a number of TCI states indicated in the target component carrier is not equivalent to a number of TCI states configured in the reference component carrier in a case that the target component carrier is indicated to perform the STRP operation or the number of TCI states indicated in the target component carrier is equivalent to the number of TCI states configured in the reference component carrier in a case that the target carrier component is indicated to perform the MTRP operation.

7. The method of claim 1, wherein a TCI state of the target carrier component is derived from i) a first TCI state configuration with a same TRP ID in the reference component carrier (CC) to which the TCI state applies, ii) a second TCI state configuration with a lowest TRP ID in the reference CC, iii) a third TCI state configuration with a lowest TCI state ID in the reference CC, iv) a fourth TCI state configuration firstly received by the user device in the reference CC, or v) a fifth TCI state configuration in the reference CC to which the TCI state does not apply.

8. The method of claim 1, wherein a TCI state of the target carrier component is not derived from a TCI state configuration in the reference component carrier (CC) in case that TRP IDs or transmission schemes or transmission operations of the target carrier component and the reference component carrier a TRP (transmission reception point) ID of the target component carrier or the reference component carrier is determined by a RRC (Radio Resource Control), MAC CE (control element), or a DCI (downlink control information).

9. The method of claim 1, wherein the target component carrier is indicated to perform a single-TRP (STRP) operation and the reference component carrier is indicated to perform a multiple-TRP (MTRP) operation, wherein the target component carrier and the reference component carrier are indicated to perform the MTRP operation, wherein the target component carrier is indicated to perform the MTRP operation and the reference component carrier is indicated to perform the STRP operation, or wherein the target component carrier and the reference component carrier are indicated to perform the STRP operation.

10. The method of claim 1, wherein a QCL-Type A source RS applied in the target component carrier is same as RS ID of a QCL-Type A source RS applied in the reference target component carrier, or wherein a QCL-Type D source RS applied in the target component carrier is same as a QCL-Type D source RS applied in the reference component carrier.

11. The method of claim 1, wherein the reference component carrier is indicated to perform a MTRP (multiple-TRP) operation or a STRP (single-TRP) operation and the TCI state applies to the reference component carrier (CC).

12. The method of claim 11, wherein the reference component carrier is included in a carrier component group used for the user device to perform a carrier aggregation (CA) operation or wherein a TCI state configuration of a downlink-uplink joint, downlink only, or uplink only is presented in a BWP of the reference component carrier, or wherein the reference component carrier is only reference component configured with TCI state configuration.

13. The method of claim 1, wherein the deriving derives multiple TCI states including the TCI state and having respective TRP IDS.

14. A method of wireless communication, comprising:

transmitting, by a network device to a user device, a signaling message including transmission configuration indication (TCI) configuration information of a target component carrier and a reference component carrier; and receiving, from the user device, an uplink transmission using the target component carrier having a transmission configuration indication (TCI) state that is derived based on a TCI state of a reference component carrier, wherein the reference component carrier is configured to provide the TCI state for the target component carrier and the TCI state does not apply to the reference component carrier.

15. The method of claim 14, wherein a TRP (transmission reception point) ID of the target component carrier or the reference component carrier is determined by a RRC (Radio Resource Control), MAC CE (control element), or a DCI (downlink control information).

16. A communication apparatus comprising at least one processor configured to implement a method comprising:

deriving, in response to a determination that a predetermined condition is met, at least one of transmission configuration indication (TCI) states of a target component carrier based on a TCI state of a reference component carrier; and applying the at least one of TCI states to the target component carrier, wherein the reference component carrier is configured to provide the TCI state for the target component carrier and the TCI state does not apply to the reference component carrier.

17. The communication apparatus of claim 16, wherein the predetermined condition is at least one of i) the communication apparatus is indicated to perform a single-TRP (STRP) operation or a multiple-TRP (MTRP) operation in the target component carrier (CC), ii) the communication apparatus is indicated to perform a carrier aggregation (CA) operation in a carrier component group including the target CC, iii) TCI state configurations of a downlink-uplink joint, a downlink only, or an uplink only are absent or not configured in a bandwidth part (BWP) of the target component carrier, iv) a BWP ID or cell ID for a QCL-Type A or D source RS in a QCL-information of a TCI state configured with DLorJointTCIstate is not provided to the target component carrier, v) a TRP ID for the QCL-Type A or D source RS is not provided to the target component carrier, or vi) a number of TCI states indicated in the target component carrier is not equivalent to a number of TCI states configured in the reference component carrier in a case that the target component carrier is indicated to perform the STRP operation or the number of TCI states indicated in the target component carrier is equivalent to the number of TCI states configured in the reference component carrier in a case that the target carrier component is indicated to perform the MTRP operation.

18. The communication apparatus of claim 17, wherein a TCI state of the target carrier component is derived from i) a first TCI state configuration with a same TRP ID in the reference carrier component (CC) to which the TCI state applies, ii) a second TCI state configuration with a lowest TRP ID in the reference CC, iii) a third TCI state configuration with a lowest TCI state ID in the reference CC, iv) a fourth TCI state configuration firstly received by the communication apparatus in the reference CC, or v) a fifth TCI state configuration in the reference CC to which the TCI state does not apply.

* * * * *